United States Patent [19]
Rowe

[11] 3,708,734
[45] Jan. 2, 1973

[54] ELECTRIC MOTOR BRAKING APPARATUS

[75] Inventor: Jean Max Rowe, Wilmington, Del.

[73] Assignee: E. I. du Pont de Nemours and Company, Wilmington, Del.

[22] Filed: Feb. 14, 1972

[21] Appl. No.: 225,901

[52] U.S. Cl..................................................318/212
[51] Int. Cl................................................H02p 3/20
[58] Field of Search...............................318/209–212

[56] References Cited

UNITED STATES PATENTS

| 2,637,007 | 4/1953 | Ricking et al. | 318/212 |
| 2,818,539 | 12/1957 | Johnson | 318/212 |
| 3,011,112 | 11/1961 | Mowery, Jr. | 318/212 |
| 3,341,758 | 9/1967 | Plumpe, Jr. | 318/212 |
| 3,412,304 | 11/1968 | Baum et al. | 318/212 |

*Primary Examiner*—Gene Z. Rubinson
*Attorney*—Harry J. McCauley

[57] ABSTRACT

Apparatus for braking an alternating current motor of the induction or synchronous three-phase or single-phase type wherein two power leads are tapped to provide unidirectional braking electric current to a preselected motor winding.

7 Claims, 14 Drawing Figures

Fig. 1.

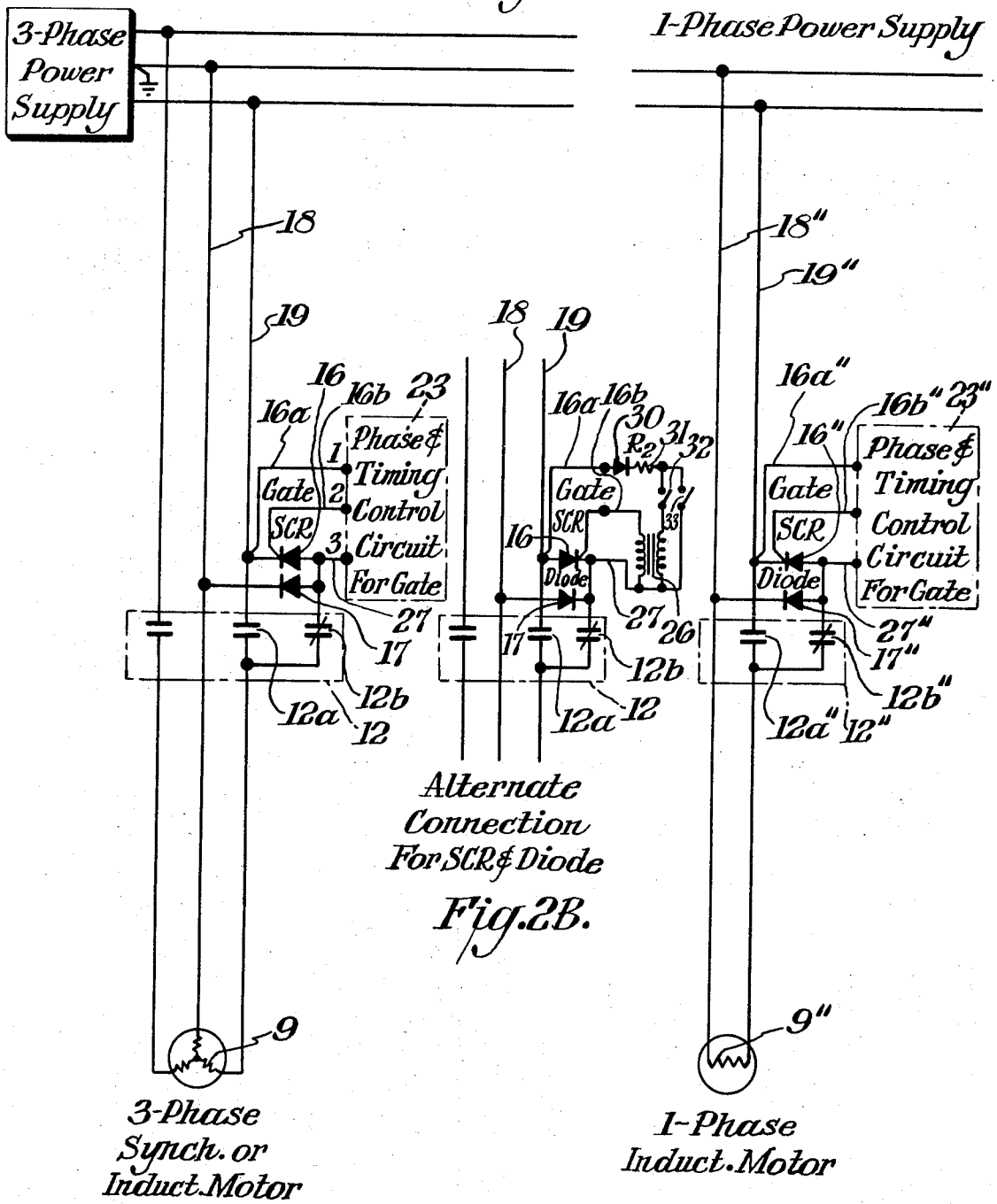

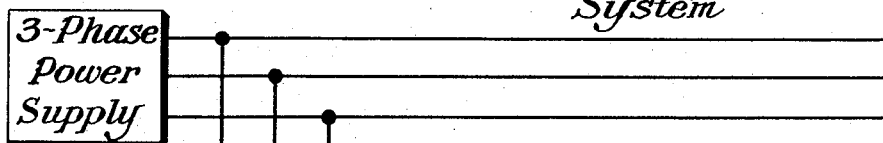
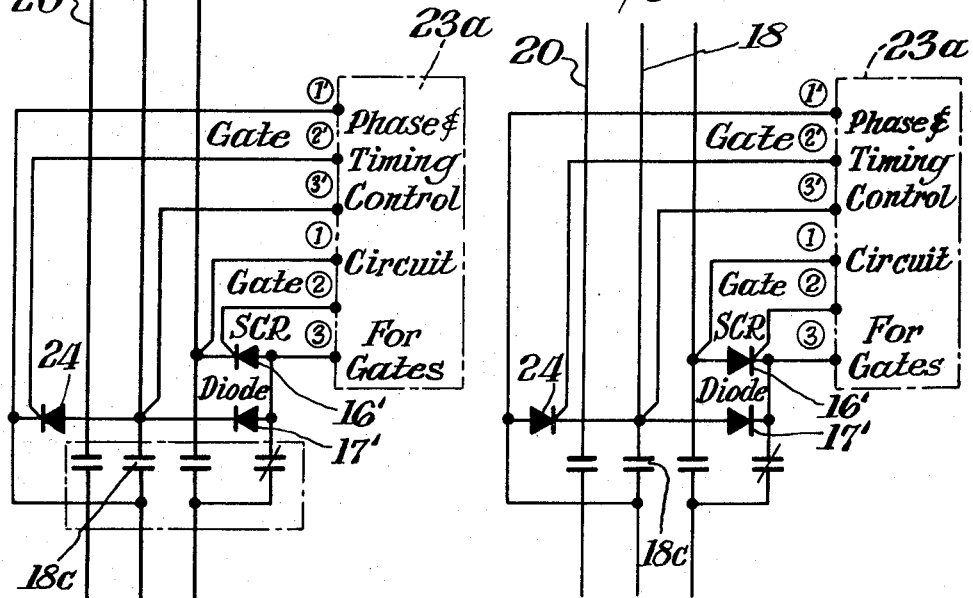

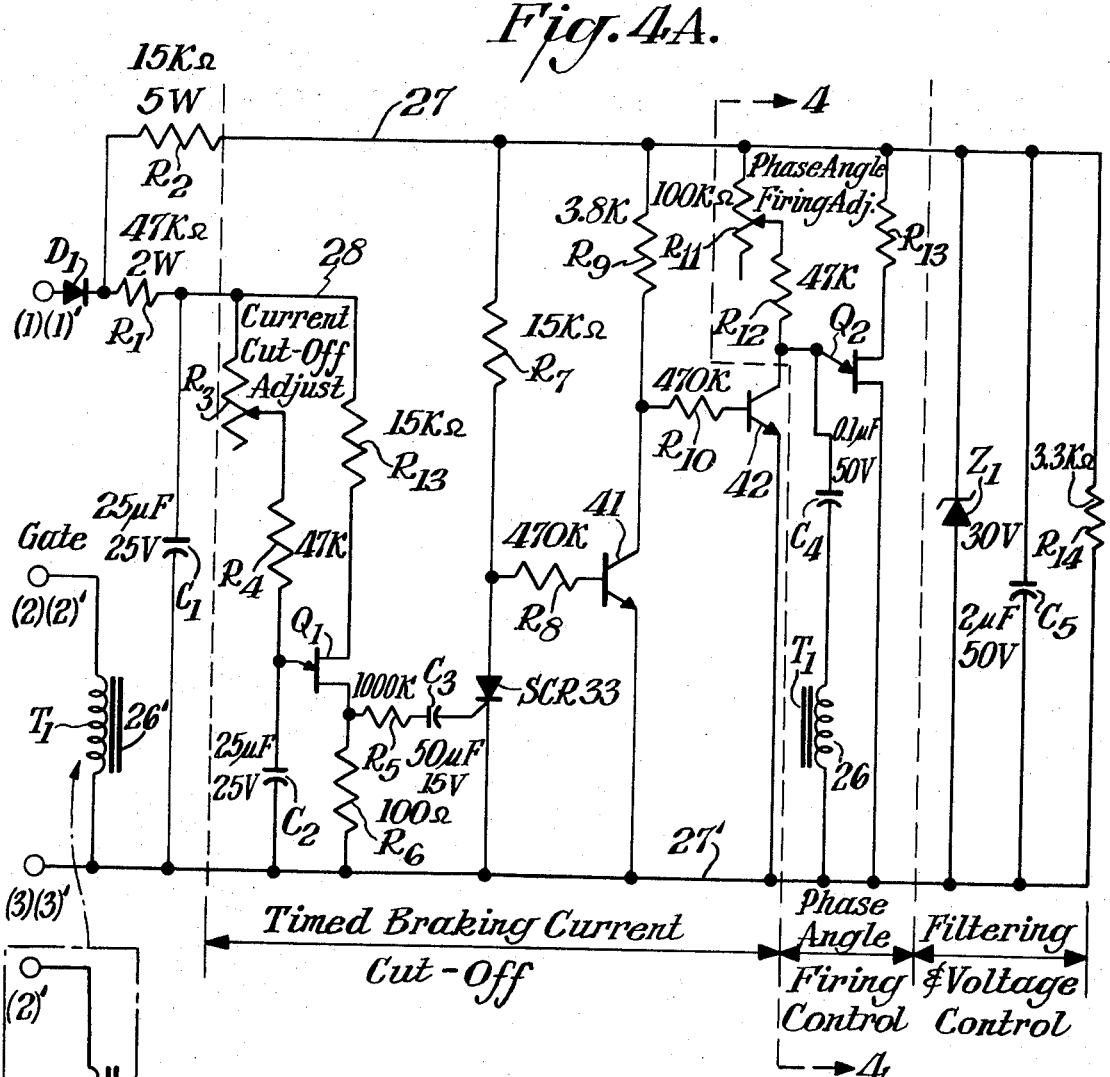
*Fig. 4A.*
*Fig. 4D.*
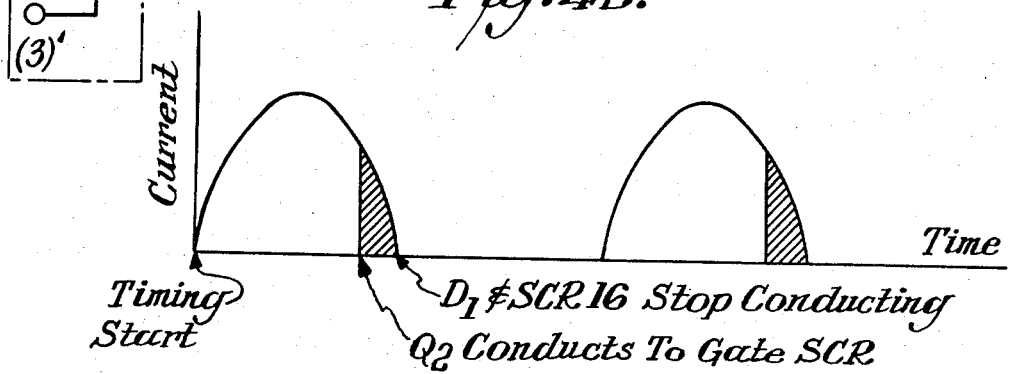
*Fig. 4B.*

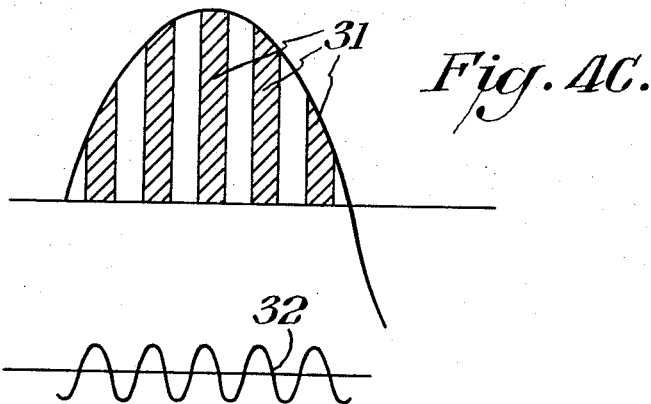
Fig. 4C.
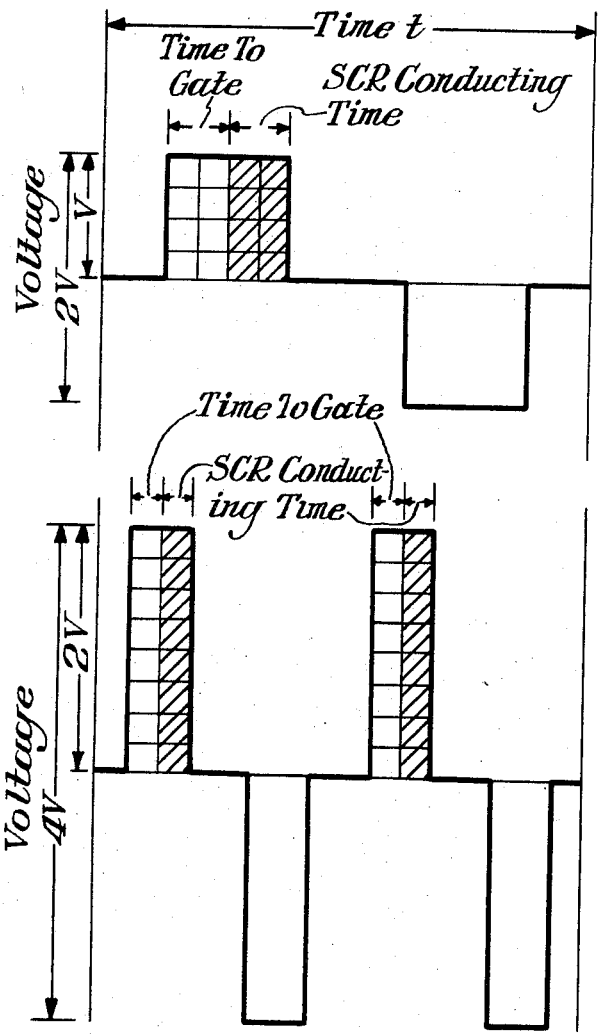
Fig. 6A.
frequency=1×Hz
Fig. 6B.
frequency 2×Hz

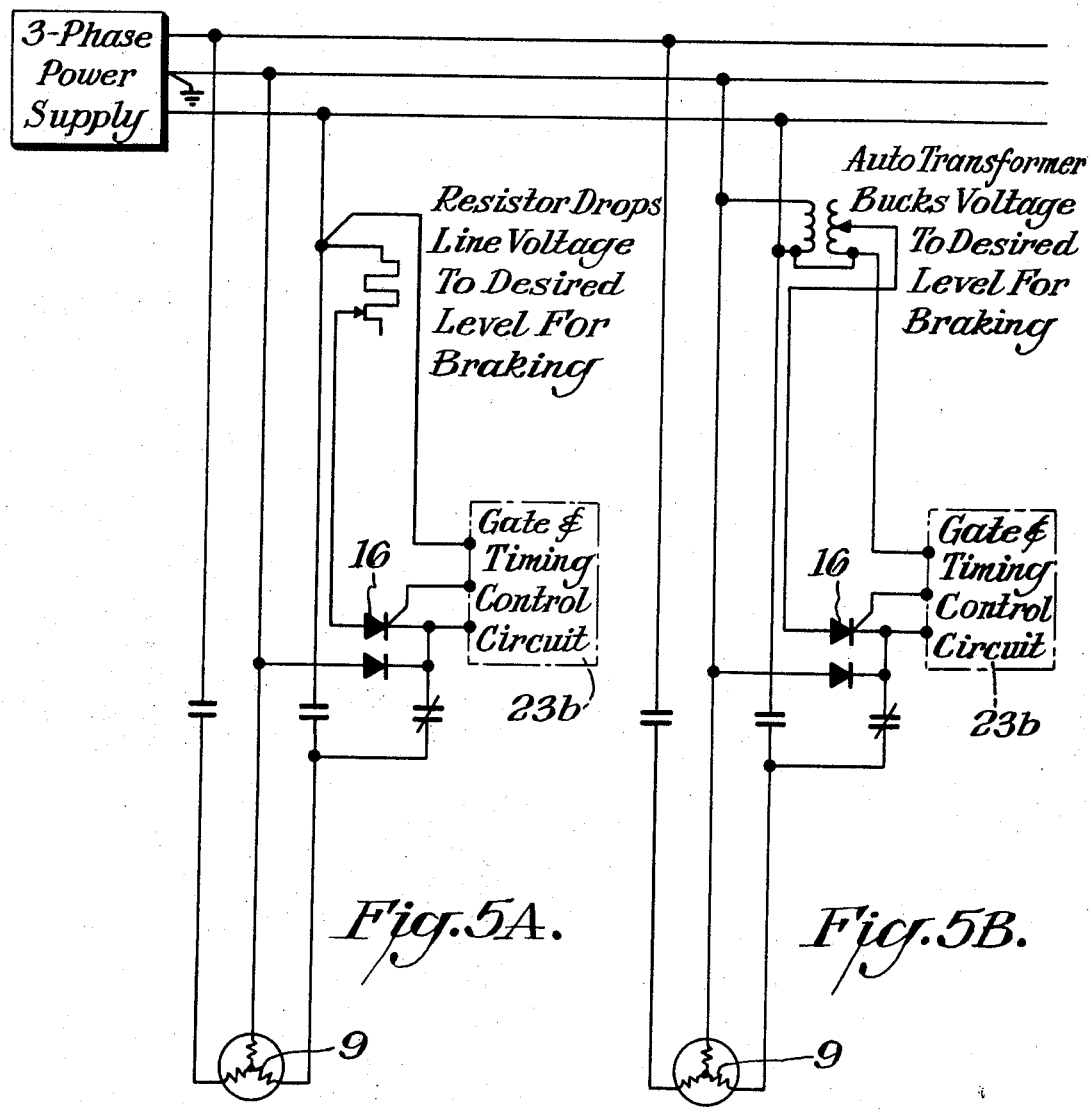
*Fig.5A.* *Fig.5B.*
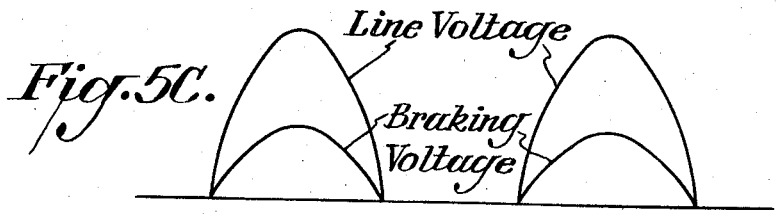
*Fig.5C.*

3,708,734

ELECTRIC MOTOR BRAKING APPARATUS

BRIEF SUMMARY OF THE INVENTION

Generally, this invention comprises apparatus for braking an alternating current motor of the induction or synchronous three-phase or single-phase type provided with a switching contactor having a first normally-open contact pair in series connection in the power supply circuit with a preselected drive winding of the motor comprising, in combination, A, for a grounded system,
1. a first silicon-controlled rectifier connected in shunt with respect to the first contact pair through a normally-closed second contact pair of the contactor,
2. a diode connected at one terminal to the return circuit path of the motor drive winding in opposed polarity sense with respect to the first silicon-controlled rectifier and, at the other terminal, between the second contact pair and the first silicon-controlled rectifier, and
3. a first gating signal supply switch-on means connected in gating circuit relationship with respect to the first silicon-controlled rectifier and in parallel connection therewith to the power supply side of the first contact pair, deriving therefrom potential reference each cycle, closure of the first gating signal supply switch-on means supplying braking unidirectional current through the first silicon-controlled rectifier to the motor drive winding, and
4. a first gating signal supply switch-off means terminating supply of braking unidirectional current to the drive winding after motor standstill, and B, for an ungrounded or Y-grounded system, components (1) to (3), inclusive, of A supra together with
4. a third normally open contact pair of the contactor interposed in series connection in the current return path of the motor drive winding on the motor side of the diode, and
5. a rectifier connected in shunt with respect to the third contact pair in series-consonant forward current direction with respect to the diode.

DRAWINGS

The invention is portrayed in the following drawings, in which:

Figure 1:
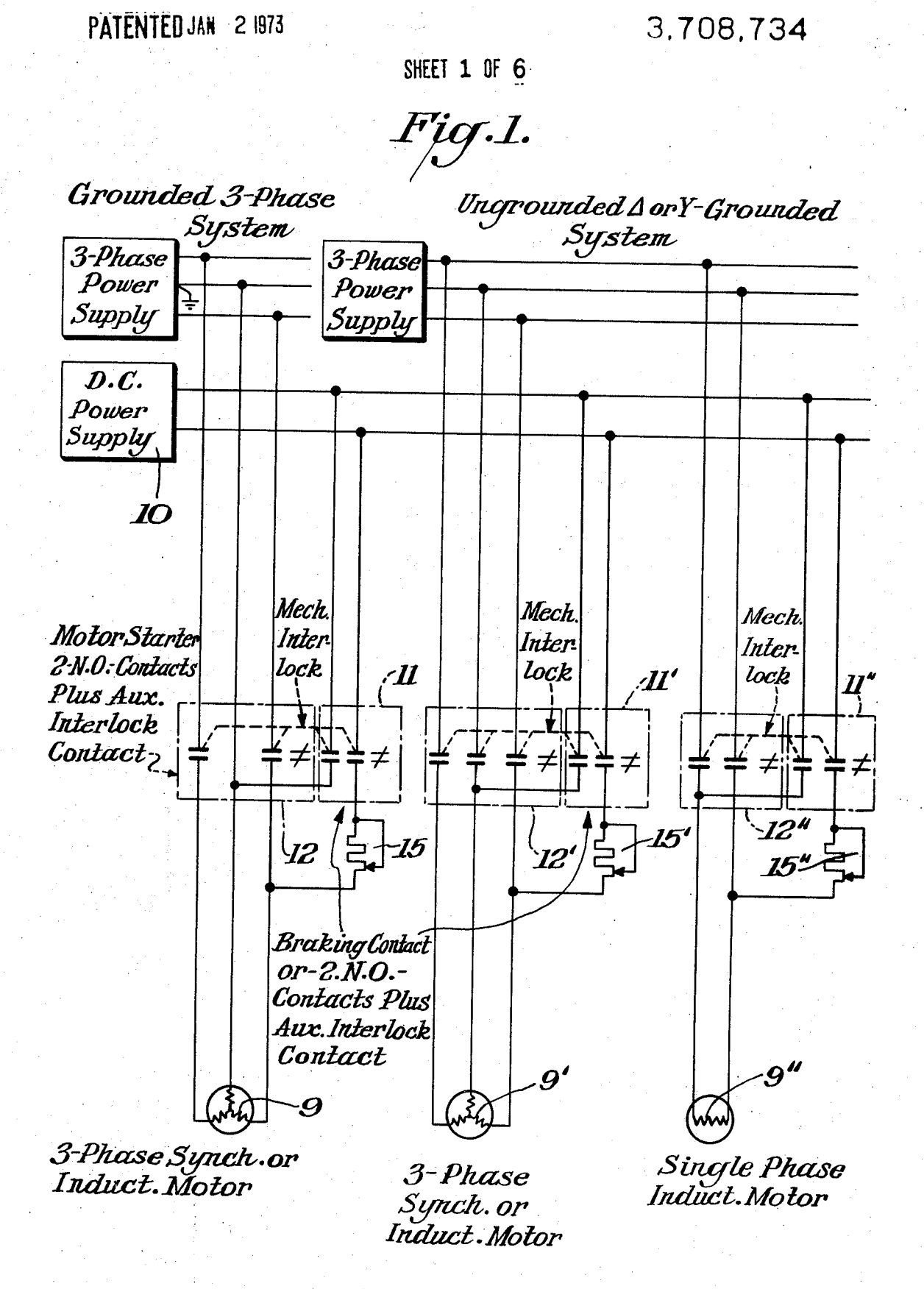

FIG. 1 is a schematic circuit diagram of a conventional d-c braking system now employed for three-phase synchronous or induction motors of both the grounded and ungrounded delta or Y-grounded types, and also of a single-phase induction motor, FIG. 2A is a schematic circuit diagram of the braking circuit of this invention as applied to three-phase synchronous or induction motors supplied from a grounded delta system, and also to a single-phase induction motor, FIG. 2B is an alternate circuit for the three-phase synchronous or induction motors of FIG. 2A, detailing also a switch-type phase and timing control, FIG. 3A is a schematic circuit diagram of a preferred embodiment of the braking circuit of this invention as applied to three-phase synchronous or induction type motors supplied from an ungrounded delta or Y-grounded system, and FIG. 3B is an alternate circuit for the embodiment of FIG. 3A, FIG. 4A is a schematic circuit diagram of a phase and timing control circuit which can be used for the control of braking duration for the embodiments of FIGS. 1-3B, FIG. 4B is a schematic representation of a preferred timing sequence of the apparatus of FIG. 4A, FIG. 4C is a schematic representation of a time sequence utilized for intermittently operated brake application, FIG. 4D is a schematic circuit representation of an additional transformer coupling which can be employed to gate the second silicon-controlled rectifier utilized in the ungrounded delta or Y-grounded system of FIGS. 3A and 3B, FIGS. 5A and 5B are, respectively, schematic circuit diagrams of the braking circuit of this invention as applied to three-phase synchronous or induction motors supplied from a grounded delta system as to which the embodiment of FIG. 5A utilizes a dropping resistor and that of FIG. 5B utilizes a bucking voltage auto transformer to preselect braking voltage, FIG. 5C is a schematic representation of a typical preselected braking voltage obtained with the embodiments of FIGS. 5A and 5B, and FIGS. 6A and 6B are schematic representations of time sequences utilized for variable frequency constant volts per $H_z$ stepped wave power supply control according to this invention.

INTRODUCTION

Referring to FIG. 1, it is conventional practice to brake three-phase synchronous or induction a-c motors, or single phase a-c induction motors, by the application of direct current through a preselected motor winding 9, 9' or 9". However, this has customarily required a separate d-c power source 10 and temporary d-c supply via a conventional two (or three) normally open contact pair contactor 11, 11' or 11" connected across the preselected motor winding in generally parallel relationship to the three normally open contact pair motor starter contactor 12, 12' or 12". The contact pairs of contactors 12, 12' and 12" are mechanically and electrically interlocked for reverse operation with the contact pairs of contactors 11, 11' and 11" respectively. Voltage adjusting resistors 15, 15' and 15" are interposed in series circuit with a preselected contact pair of the contactors 11, 11' and 11" to adjust the braking voltage to a level appropriate to obtain the desired speed of braking to a standstill.

Another method employs for each motor a rectifier supplied from a transformer connected to an alternating current source. Taps on the transformer winding permit selection of a suitable d-c braking voltage amplitude. Either method usually incorporates a timing relay to interrupt the d-c braking voltage circuit to the motor winding at a preselected time after the motor has reached standstill.

There are inadequacies inherent in these systems, the most serious being in applications for variable speed induction or synchronous motors connected to variable frequency constant volts per Hertz supplies, or for induction motors using voltage control of speed. Braking voltage is normally adjusted to stop the motor from the highest speed in a given timed period. When the motor is braked from a lower speed, the same braking voltage is applied for the same time period, although the motor rotation has stopped much earlier. Thus, energy is wasted in excessive heating of motor windings, thereby reducing apparatus operating life. It is often desirable to brake a motor in the same time irrespective of operating speed.

THE INVENTION

Referring to FIGS. 2A and 2B, applicant has devised a simple solid-state circuit which proportions braking force as a function of the motor speed to be braked, while, at the same time, dispensing with an independent d-c power source 10 and contactors 11, 11' and 11" altogether.

To do this, applicant utilizes a silicon-controlled rectifier 16 (or 16") connected in shunt through a normally closed contact pair 12b (or 12b") of contactor 12 (or 12") with respect to the contact pair 12a (or 12a") supplying power to the motor drive winding 9 (or 9"). In addition, a diode 17 (or 17") is connected, in opposed polarity sense with respect to SCR 16 (or 16"), at one terminal to the return circuit path 18 (or 18") of windings 9 (and 9"), respectively, and, at the other terminal, between the contact pair 12b (or 12b") and SCR 16 (or 16").

The purpose of SCR 16 (or 16") is to pass an electric current from motor power lead 19 (or 19") during either the positive or negative half cycle of a-c. At the same time the SCRs rectify this current to supply a braking unidirectional current through closed contacts 12b (or 12b") to motor winding 9 (or 9"). Diode 17 (or 17") is provided to isolate SCR 16 (or 16") from the negative polarity inductive back e.m.f. of the motor being braked.

Referring to FIG. 2B particularly, braking can be equally well achieved during the negative half-cycle of a-c supply simply by reversing the circuit connections of SCR 16 and diode 17.

The gating voltage for SCR 16 (or 16") is drawn via lead 16a (or 16a") connected with motor power lead 19 (or 19") and lead 27 (or 27") and is connected with gating lead 16b (or 16b") through a timing control, as shown in FIG. 2A. For purposes of explanation only, the principle of my invention will become clear by reference to FIG. 2B. Here a hypothetical switching arrangement is utilized for phase timing and gating control, this embodying parallel-connected switches 32 and 33 interposed in series circuit via diode 30, voltage dropping resistor 31 and lead 16a running to power lead 19. On the opposite side, switch 32 is series-connected and switch 33 is shunt-connected to the primary winding of transformer 26, and the circuit to diode 17 and SCR 16 is completed by lead 27. The transformer secondary circuit is completed to the gating element of SCR 16 by lead 16b.

Now, in operation, let it be assumed that, at the same instant during each conducting half cycle through diode 30, that switch 32 is closed and immediately reopened. This passes a pulse through the transformer 26 primary winding and via the secondary winding connected to lead 16b, thereby gating SCR 16 and causing braking current conduction therethrough for the remainder of the half cycle. The relationship of braking current supply obtained versus time is represented diagrammatically in FIG. 4B, hereinafter described. When braking current is no longer required, switch 33 is closed, thereby short-circuiting the primary winding of transformer 26, which discontinues pulse transmission to the gate of SCR 16 and any further conduction of braking current therethrough.

As a practical matter, an automatic phase and timing control unit 23 (or 23") is employed for cyclic braking current provision, one preferred design of which is detailed in FIGS. 4A, 4B and 4D.

Referring to FIG. 4A, there is shown in schematic representation one design of conventional phase and timing circuit which is particularly intended for the control of the grounded delta or single phase systems of FIG. 2A.

In general, phase angle firing control of SCR conduction is achieved by the sub-circuit to the right of line 4—4, whereas timing control is achieved by the subcircuit to the left of this line.

The phase and time controller is transformer-coupled through primary winding 26 and secondary winding 26', the respective connections with the circuit of FIG. 2A being denoted by integers 1-3, inclusive, of both FIGS. 2A and 4A.

The control circuit of FIG. 4A operates on d-c exclusively, provided by diode $D_1$ which can typically be a type 1N5054.

Dropping resistors $R_1$ and $R_2$ are, typically, 47 Kohms, and 15 Kohms, respectively, which lower the voltage across main buses 27 and 28 to 27' from 440v to about 30v.

Zener diode $Z_1$ (typically, 30v rating) is a constant maximum voltage supply limiter. Shunt capacitors $C_1$ (typically, 25$\mu$F size) and $C_5$ (typically 2$\mu$F) with shunt resistor $R_{14}$ (typically 3.3 Kohm) provide filtering.

The control sought is obtained by employing two timing networks, the first incorporating resistor $R_{11}$ (typically 100 Kohms variable), $R_{12}$ (typically 47 Kohms) and capacitor $C_4$ (typically 0.1$\mu$F), this sub-circuit operating at the micro-second level. Upon the opening of contact pair 12a and the closing of contact pair 12b (FIG. 2A) a potential is established across SCR 16 between 16a and lead 28. On each conducting half cycle of diode $D_1$, current flows to charge capacitor $C_4$. When the voltage at the emitter of unijunction transistor $Q_2$ (typically a type 2N1671) exceeds the voltage across the bases of the transistor, $Q_2$ fires and a current pulse flows through the transformer primary 26, providing a pulse in the transformer secondary 26' connected to the SCR 16 gate (via terminal (2)), causing conduction through the SCR 16 during the remaining portion of the half cycle as shown by the shaded areas in FIG. 4B. By adjusting the resistance setting of $R_{11}$ the charging time of capacitor $C_4$ and the resulting conducting time interval of SCR 16 during each half cycle is preselected.

The second timing network, consisting of resistor $R_3$ (typically 1 megohm variable), resistor $R_4$ (typically 47 Kohms) and capacitor $C_2$ (typically 25$\mu$F) provides timing in seconds. On each conducting half cycle of diode $D_1$ current flows to charge capacitor $C_2$. When the voltage at the emitter of unijunction transistor $Q_1$ exceeds the voltage across the bases of the transistor, Q₁ fires. The resulting current pulse gates SCR 33 (typically an HEP 320) causing conduction and dropping the potential of the $R_7$ and $R_8$ junction to that of bus 27'. This changes the state of transistor 41 (typically a 2N3304) from conducting to non-conducting (i.e., the circuit bus 27 - $R_9$ - collector-emitter 41 - Bus 27' is open). The potential of the $R_9$, $R_{10}$ junction thus rises above that of bus 27' and the state of transistor 42 (typically a 2N3304) is changes from non-conducting to conducting (i.e., the circuit bus 27 - $R_{11}$ - $R_{12}$ - collector-emitter 42 bus 27' closes) thus short circuiting the transformer $T_1$ primary 26, halting further gating of SCR 16 and conduction of braking current. By adjusting the resistance setting of resistor $R_3$ the charging time of capacitor $C_2$ and the resulting duration of braking current is preselected.

Referring to FIGS. 3A and 3B, braking can also be readily achieved as regards ungrounded delta or Y-grounded motor systems. A preferred design utilizes a 6- terminal phase and timing control auxiliary 23a, together with a second SCR 24, which latter completes the circuit for the braking d-c by shunt connection around the open contact pair 18c, which now is interposed in circuit between lead 18 and the corresponding motor power supply terminal.

Control auxiliary 23a can, optionally, comprise two separate identical circuits of the design shown in FIG. 4A, in which case the respective operating lead connections between the circuits of FIGS. 3A (and 3B) and the controller are denoted by the integers 1,1'-3,3'', inclusive, drawn in all three figures.

More economically, a second secondary winding 26'' can be added to the transformer $T_1$ of FIG. 4A as indicated in FIG. 4D, in which arrangement terminals (2') and (3') are, respectively, connected to the gate and anode of SCR 24. [In this latter circuit, there need be no connection (1') to controller 23a, because phase reference is now provided by connection (1)].

Where one employs a separate control circuit for SCR 24, FIG. 3A, it is possible to dispense with the Phase Angle and Firing Control sub-circuit of FIG. 4A for SCR 24 by substituting simply a diode in series with a dropping resistor, which turns the primary windong of transformer $T_1$ on for the full half cycle. Braking current is shut off by Timed Braking Current Cut-off sub-circuit of FIG. 4A for SCR 16'.

A further simplification for a three-phase ungrounded or Y-grounded system such as shown in FIG. 3A consists of the substitution of a diode for SCR 24, thereby obviating any gating control such as 23 or 23a for a second SCR. Accordingly, the term "rectifier" is utilized generically in the claims to comprehend collectively diodes, silicon-controlled rectifiers or, in fact, other equivalent rectifier devices.

Frequently, it is desirable to employ a plug-in receptacle (not shown) between the motor and contactor 12 (or 12''). Under these circumstances, a second SCR 24 such as shown in FIGS. 3A and 3B is preferred over a diode for safety reasons. If plug-in receptacles are not used, diodes may be preferable because of their somewhat lower costs.

In operation, braking can be achieved by equal single incremental d-c supply pulses, denoted by the shaded areas in successive positive half-cycles of supply current in FIG. 4B. The time at which the gating signal is turned on in each half cycle can be preselected to suit braking current requirements.

Another method of varying the conducting period of the SCR comprises utilizing a plurality of pulses 31 distributed over each positive half cycle as shown in FIG. 4C. In this case, SCR operation is subordinated to a high-speed oscillator serving as a pulse timer, as indicated by the pulse train 32 drawn below the cycle trace of FIG. 4C.

Control according to this invention is preferably effected by (1) phase angle firing and (2) pulse width modulation. However, it will be apparent that other control modes can be employed such as, for example, preselection of line voltage amplitude magnitude using, typically, a variable resistor or tapped transformer. Thus, referring to FIGS. 5A and 5B, the gate of SCR 16 is energized through entire conducting half cycles, so that the SCR will be in conducting state for the preselected voltage amplitude, as indicated in FIG. 5C.

As hereinbefore described with reference to FIG. 2B, an alternate embodiment utilizing the negative half-cycle of a-C power for braking can be employed by merely reversing the polarity connections of SCRs 16' and 24' and diode 17' from that shown in FIG. 3A to that shown in FIG. 3B.

While FIGS. 5A and 5B relate solely to a grounded three-phase system or single-phase power supply, voltage amplitude control can be provided for ungrounded delta or Y-grounded systems equally well by simply adding a second rectifier, such as SCR 24, FIG. 3A, connected in shunt around a middle contact pair, such as 18c, FIG. 3A, using the same second secondary winding gate control as hereinbefore described with reference to FIGS. 4A and 4D.

The gating controller 23b used for voltage amplitude control can be simplified by dispensing with the phase angle firing control sub-circuit of FIG. 4A, since braking is over the full half-cycle with the FIGS. 5A, 5B design.

This invention is also adapted to utilization with variable frequency-constant volts per Hertz power supplies, in which case the braking time from any speed for an alternating current motor supplied from a variable frequency-constant volts per Hertz sine or stepped wave power supply is made essentially constant. This is illustrated in FIGS. 6A and 6B which show graphically the stepped wave form produced by a d.c.-a.c. inverter for speed control of variable speed motors.

It will be understood that inertia varies as the square of the motor speed, whereas the braking force, imposed by the braking voltage, varies as the square of the voltage input. Thus, using individual variable frequency-constant volts per Hertz power supplies, it is practicable to preselect the braking time of a multiplicity of motors to achieve equal braking time durations independent of the rotational speeds of the several motors. This effect is shown in FIGS. 6A and 6B, wherein, when the frequency is doubled, the braking voltage imposed is doubled.

FIG. 6A shows a stepped alternating current wave of 2v amplitude and frequency equal to 1 × Hertz, where one cycle is completed in time $t$. Assume that the positive half cycle of unidirectional voltage is to be applied for braking and that resistor $R_{11}$, FIG. 4A, has been adjusted so that the charging of capacitor $C_4$ requires 8—v × T units (shown in equal block representation), after which SCR 16 is gated to conduct the remaining 8—v × t units of the positive half cycle.

When the power supply frequency is doubled to 2 × Hertz, voltage is doubled as is motor speed, while inertia is squared, FIG. 6B. The charging of capacitor $C_4$ requires the same 8—v × t units. However, since two positive half cycles of double voltage occur in time t, twice the braking force is applied to stop the motor in the same time.

A conventional zero rotation detector, such as a shaft provided with a gear tooth inducing an electrical count signal in an inductive pick-up coil, can be employed to cut off braking current responsive to cessation of motor rotation and thus can constitute a substitution for the controller of FIG. 4A, or a desirable auxiliary thereto, depending upon the specific mode of braking voltage input resorted to.

What is claimed is:

1. A braking circuit for an alternating current motor of the induction or synchronous three-phase or single-phase type provided with a switching contactor having a first normally-open contact pair in series connection in the power supply circuit with a preselected drive winding of said motor comprising, in combination, A, for a grounded system,
 1. a first silicon-controlled rectifier connected in shunt with respect to said first contact pair through a normally-closed second contact pair of said contactor,
 2. a diode connected at one terminal to the return current path of said motor drive winding in opposed polarity sense with respect to said first silicon-controlled rectifier and at the other terminal between said second contact pair and said first silicon-controlled rectifier,
 3. a first gating signal supply switch-on means connected in gating circuit relationship with respect to said first silicon-controlled rectifier and in parallel connection therewith to the power supply side of said first contact pair, deriving therefrom potential reference each cycle, closure of said first gating signal supply switch-on means supplying braking unidirectional current through said first silicon-controlled rectifier to said drive winding, and
 4. a first gating signal supply switch-off means terminating supply of said braking unidirectional current to said drive winding after motor standstill, and B, for an ungrounded or Y-grounded system, components (1) to (4), inclusive, of A supra together with
 5. a third normally open contact pair of said contactor interposed in series connection in said current return path of said motor drive winding on the motor side of said diode, and
 6. a rectifier connected in shunt with respect to said third contact pair in series-consonant forward current direction with respect to said diode, providing a circuit completion path for said drive winding.

2. A braking circuit for an alternating current motor of the induction or synchronous three-phase or single-phase type provided with a switching contactor having a first normally-open contact pair in series connection in the power supply circuit with a preselected drive winding of said motor comprising, in combination, A, for a grounded system,
 1. a first silicon-controlled rectifier connected in shunt with respect to said first contact pair through a normally-closed second contact pair of said contactor,
 2. a diode connected at one terminal to the return current path of said motor drive winding in opposed polarity sense with respect to said first silicon-controlled rectifier and at the other terminal between said second contact pair and said first silicon-controlled rectifier,
 3. a first gating signal supply switch-on means connected in gating circuit relationship with respect to said first silicon-controlled rectifier and in parallel connection therewith to the power supply side of said first contact pair, deriving therefrom potential reference each cycle, closure of said first gating signal supply switch-on means supplying braking unidirectional current through said first silicon-controlled rectifier to said drive winding, and
 4. a first gating signal supply switch-off means terminating supply of said braking unidirectional current to said drive winding after motor standstill, and B, for an ungrounded or Y-grounded system, components (1) to (4), inclusive, of A supra together with
 5 a third normally open contact pair of said contactor interposed in series connection in said current return path of said motor drive winding on the motor side of said diode,
 6 a second silicon-controlled rectifier connected in shunt with respect to said third contact pair in series-consonant forward current direction with respect to said diode, and
 7 a second gating signal supply switch-on means connected in gating circuit relationship with respect to said second silicon-controlled rectifier and in parallel connection therewith, deriving potential reference each cycle, closure of said second gating signal supply switch-on means providing a circuit completion path for said drive winding in time synchronism with the supply of said braking unidirectional current through said first silicon-controlled rectifier to said drive winding.

3. A braking circuit for an alternating-current motor of the induction or synchronous three-phase or single-phase type according to claim 1 incorporating means fixing the time period in each cycle of the alternating supply current during which said first silicon-controlled rectifier and said rectifier connected in shunt with respect to said third contact pair are actuated to conductive state to thereby effect a preselected application of braking force to said motor.

4. A braking circuit for an alternating-current motor of the induction or synchronous three-phase or single-phase type according to claim 1 incorporating means fixing voltage amplitude at a preselected level within each cycle of said alternating-current during which first said silicon-controlled rectifier and said rectifier connected in shunt with respect to said third contact pair are actuated to conductive state to thereby effect a preselected application of braking force to said motor.

5. A braking circuit for an alternating-current motor of the induction or synchronous three-phase or single-phase type according to claim 1 incorporating means actuating said silicon-controlled rectifier and said first rectifier connected in shunt with respect to said third contact pair to non-conducting state after a preselected elapsed time, thereby limiting the application of unidirectional current to said preselected winding of said motor.

6. A braking circuit for an alternating current motor of the induction or synchronous three-phase or single-phase type according to claim 1 incorporating means actuating said first silicon-controlled rectifier to non-conductive state responsive to sensed zero rotational state of said motor.

7. A braking circuit for an alternating current motor of the induction or synchronous three-phase or single-phase type according to claim 1 wherein the power supply is of the variable frequency-constant volts per Hertz type.

* * * * *